Patented Nov. 23, 1948

2,454,386

UNITED STATES PATENT OFFICE 2,454,386

MANUFACTURE OF FUMARIC ACID

Louis H. Howland, Watertown, and William F. Brucksch, Jr., Bethany, Conn., assignors to United States Rubber Company, New York, N. Y., a corporation of New Jersey No Drawing. Application April 27, 1946, Serial No. 665,632

1 Claim. (Cl. 260—537)

This invention relates to the conversion of cis alpha-beta unsaturated carboxylic acids to their trans isomers, and more particularly of maleic acid to fumaric acid. An object of this invention is to provide a catalytic means whereby the cheap and abundant maleic anhydride is easily and readily converted into fumaric acid.

It is known that the isomerization of maleic acid to fumaric acid is accelerated by various inorganic materials such as iodine, bromine, hydrochloric acid, hydrobromic acid, sulfuric acid, potassium thiocyanate, sodium bromide and ammonia. Pyridine has also been observed to catalyze the rearrangement. For a proposed mechanism of the isomerization and a discussion of the prior art, reference is made to the publications of Nozaki and Ogg in Journal American Chemical Society, 63, 2583 (1941), and of Nozaki, ibid 63, 2681 (1941). As pointed out by these authors, the catalysts used for the isomerization of maleic acid are equally usable for the cis-trans isomerization of all alpha-beta unsaturated carboxylic acids. The same is true of the catalysts of this invention.

The invention is broadly concerned with the conversion of cis alpha-beta unsaturated dicarboxylic acids to their trans isomers by means of a catalyst of conversion which is generally described as a tautomeric heterocyclic compound in which the heterocyclic ring consists of two adjacent carbon atoms, one of which carbon atoms nuclearly bonded to nitrogen, and the other to a member of the sulfur-oxygen group of the periodic table, a nuclear carbon atom intermediate the nitrogen and said member and joined to each other, said ring having a non-nuclear sulfur atom bonded to the last mentioned carbon atom. To this class belong the thiazyl sulfides and the dihydrothiazyl sulfides, e. g., the 2-mercapto thiazoles, and the 2-mercapto thiazoline compounds, and their metal and ammonium salts; also the oxazolyl sulfides.

The invention is more particularly concerned with the discovery that mercapto heterocyclic compounds and their salts having the formula

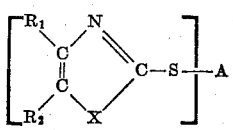

where $R_1$ and $R_2$ are selected from the group consisting of hydrogen and hydrocarbon; X is sulfur or oxygen; and A is selected from the group consisting of hydrogen, substitute salt-forming groups, and the group within the brackets, are accelerators for the conversion of maleic acid to fumaric acid. These accelerators are the thiazyl sulfides and the oxazolyl sulfides.

Exemplary of such chemicals are: 2-mercapto 4-methyl thiazole, 2-mercapto 5-methyl thiazole, 4,5-dimethyl 2-mercapto thiazole, 3-ethyl 2-mercapto thiazole, 3-mercapto 4-propyl thiazole, 2-mercapto thiazoline, 2-mercaptoxazole, 2-mercapto 4-methyl oxazole, 2-mercapto benzothiazole, 2-mercaptobenzoxazole, 2-mercapto tetrahydro benzothiazole, sodium salt of 2-mercaptobenzothiazole, ammonium salt of 2-mercaptobenzothiazole, dimethyl ammonium salt of 2-mercaptobenzothiazole, and 2,2'-benzothiazyl disulfide.

The free mercaptothiazoles exist in tautomeric equilibrium with the keto form, and therefore for the purposes of this invention such tautomers are to be considered equivalent to each other.

The conversion of maleic acid to fumaric acid is conveniently carried out in water solution at an elevated temperature. Fumaric acid being relatively water-insoluble separates as soon as its concentration exceeds its solubility. At the end of the isomerization the water mixture is cooled, filtered, and the fumaric acid purified by washing with water or digestion with 1 N-hydrochloric acid. The yield of the fumaric acid is dependent upon the concentration of the maleic acid, the amount of catalyst, and the temperature of the conversion.

In general, a temperature of at least 50° C. should be maintained, and preferably the temperature should be at or slightly below the boiling point of the water solution. Stirring is recommended to prevent bumping and spattering caused by the suspended fumaric acid. The optimum concentration of the maleic acid for each heterocyclic compound can be determined experimentally by adding 2% of the compound to a gently boiling aqueous solution of maleic acid based on the total weight of solution and refluxing for 2 hours. The reaction mixture is then cooled, diluted with water, filtered, and the separated fumaric acid washed with water and dried. The preferable maleic acid concentration usually lies in the range of 40–60%. Above about 60% maleic acid concentration, the yield decreases.

The amount of catalyst necessary can be varied over a wide range generally from 0.1 to 5% based upon the total concentration of the maleic acid solution. If the catalyst is particularly vigorous, it may be added gradually as a powder, or as a concentrated water solution of a water-soluble salt thereof.

The following table lists the yields of fumaric acid obtained by the addition of 2 grams catalyst to a gently boiling solution of 60 grams maleic anhydride in 40 grams water and heating for 2 hours, cooling, diluting with water, filtering and drying the fumaric acid.

| Catalyst | Percent Yield Fumaric Acid |
|---|---|
| 4,5-Dimethyl 2-mercaptothiazole | 97.0 |
| 2-Mercapto 4-methyl thiazole | 81.5 |
| 2-Mercapto thiazoline | 70.0 |
| 2-Mercapto benzothiazole | 64.0 |
| A mixture of bis 4,5-dimethyl thiazyl sulfide (85%) and bis 4-ethyl thiazyl sulfide (15%) | 64.0 |
| 2,2'-Benzothiazyl disulfide | 61.8 |
| 2-Mercapto benzoxazole | 34.9 |
| Sodium salt of 2-mercaptobenzothiazole | 34.7 |
| Blank | 0.0 |

While the invention has been described in particular detail for the isomerization of maleic acid to fumaric acid, it is also applicable as aforesaid to the cis-trans isomerization of all alpha-beta unsaturated carboxylic acids; for example, isocrotonic acid, citraconic acid, isocinnamic acid, and cis-methyl glutaconic acid, among many others.

While we have shown and described various embodiments of the invention, it is to be understood that the invention is susceptible to those modifications which appear within the spirit of the invention and the scope of the appended claim.

Having thus described our invention, what we claim and desire to protect by Letters Patent is:

A method of converting maleic acid to fumaric acid which comprises heating the maleic acid in an aqueous solution with 4,5-dimethyl 2-mercaptothiazole.

LOUIS H. HOWLAND.
WILLIAM F. BRUCKSCH, Jr.

REFERENCES CITED

The following references are of record in the file of this patent:

UNITED STATES PATENTS

| Number | Name | Date |
|---|---|---|
| 2,404,103 | Scott | July 16, 1946 |

OTHER REFERENCES

Clemo et al., "J. Chem. Soc. of London," Pt. 1, 1930, pages 213–215.

Taube, J. Am. Chem. Soc., vol. 65, page 526, 1943.